(12) United States Patent
Panteleenko et al.

(10) Patent No.: US 9,563,521 B2
(45) Date of Patent: Feb. 7, 2017

(54) DATA TRANSFERS BETWEEN CLUSTER INSTANCES WITH DELAYED LOG FILE FLUSH

(71) Applicant: Oracle International Corporation, Redwood Shores, CA (US)

(72) Inventors: Vsevolod Panteleenko, San Mateo, CA (US); Yunrui Li, Fremont, CA (US); Neil J. S. MacNaughton, Los Gatos, CA (US); Vinay H. Srihari, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 194 days.

(21) Appl. No.: 14/337,077

(22) Filed: Jul. 21, 2014

(65) Prior Publication Data

US 2016/0019121 A1    Jan. 21, 2016

(51) Int. Cl.
*G06F 11/14* (2006.01)
*G06F 3/06* (2006.01)
*G06F 11/20* (2006.01)

(52) U.S. Cl.
CPC ............. *G06F 11/1469* (2013.01); *G06F 3/06* (2013.01); *G06F 11/1471* (2013.01); *G06F 11/2094* (2013.01); *G06F 2201/835* (2013.01); *G06F 2201/84* (2013.01)

(58) Field of Classification Search
CPC .............. G06F 11/2028; G06F 11/2025; G06F 11/2082; G06F 11/2076; G06F 11/2058; G06F 11/1471; Y10S 707/99954
See application file for complete search history.

(56) References Cited

U.S. PATENT DOCUMENTS

| | | | | |
|---|---|---|---|---|
| 5,280,611 | A * | 1/1994 | Mohan | G06F 11/1471 |
| 6,567,928 | B1 * | 5/2003 | Lyle | G06F 11/1471 707/999.202 |
| 7,277,900 | B1 * | 10/2007 | Ganesh | G06F 17/30551 707/682 |
| 7,617,254 | B2 * | 11/2009 | Loaiza | G06F 17/30368 |
| 8,051,328 | B1 * | 11/2011 | Smith | G06F 11/2092 714/15 |
| 2002/0095403 | A1 * | 7/2002 | Chandrasekaran | G06F 12/0804 |
| 2004/0049572 | A1 * | 3/2004 | Yamamoto | G06F 17/30067 709/224 |

(Continued)

*Primary Examiner* — Bryce Bonzo
*Assistant Examiner* — Jeison C Arcos
(74) *Attorney, Agent, or Firm* — Hickman Palermo Becker Bingham LLP; Daniel D. Ledesma

(57) ABSTRACT

Techniques for processing changes in a cluster database system are provided. A first instance in the cluster transfers a data block to a second instance in the cluster before a redo record that stores one or more changes that the first instance made to the data block is durably stored. The first instance also transfers, to the second instance, a block change timestamp that indicates when a redo record for the one or more changes was generated by the first instance. The first instance also separately sends, to the second instance, a last store timestamp that indicates when the last redo record that was durably stored was generated by the first instance. The block change timestamp and the last store timestamp are used by the second instance when creating redo records for changes (made by the second instance) that depend on the redo record generated by the first instance.

20 Claims, 9 Drawing Sheets

(56) References Cited

U.S. PATENT DOCUMENTS

| | | | | |
|---|---|---|---|---|
| 2007/0100912 A1* | 5/2007 | Pareek | ............... | G06F 11/1466 |
| 2007/0124348 A1* | 5/2007 | Claborn | .............. | G06F 11/2025 |
| 2007/0162717 A1* | 7/2007 | Mikami | ............. | G06F 11/2069 711/162 |
| 2008/0178185 A1* | 7/2008 | Okada | ................ | G06F 11/1469 718/103 |

* cited by examiner

DATA TRANSFERS BETWEEN CLUSTER INSTANCES WITH DELAYED LOG FILE FLUSH

FIELD OF THE DISCLOSURE

The present disclosure relates to transferring a data item between nodes of a cluster and, more particularly to, performing the transfer without first waiting for changes, made to the data item by the transferred node, to be durably stored.

BACKGROUND

A cluster database system comprises multiple nodes, each of which executes one or more database server instances that share the same storage where database files reside. Each instance reads and modifies data blocks in the instance's own memory cache and synchronizes reads from and writes to the shared storage with other instances through a synchronization mechanism. Changes to data blocks are made within transactions that read and modify the data blocks. Transactions generate redo records (collectively "redo") for changes made to data blocks. A single redo record may indicate one or more changes. Each instance causes redo records to be written to one or more durable log files that are separate from the log files of each other instance. A data block is written from volatile memory to the shared database after the redo up to and including the last change to the data block is written to storage in order to guarantee that the database does not contain changes not reflected in the redo.

Redo for changes that are made to a data block follow the order in which the changes are made on different instances in a cluster. The order may be guaranteed by assigning a global (i.e., for all the instances in the cluster) sequence number or timestamp for each change, which is also contained in each redo record. During recovery, redo log files from different instances are merged based on the respective timestamps of the different redo records to create an ordered redo stream for each data block.

One approach to enforce the order of redo for a data block is to delay the inter-instance transfer of a data block until all redo for that data block is written to persistent storage. This approach guarantees that if the source instance crashes after the data block is sent, there would be no lost redo that comes before the redo for changes made on the destination instance.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for allowing data block transfers between cluster instances without waiting for redo for such data blocks to be durably stored. The changes that are subsequently made based on the transferred blocks, by the destination instance (and any following instances if the data block is sent to more than one instance), are made conditionally. The subsequent changes are discarded if the source instance crashes without writing its redo for transferred blocks. Also no transaction that touched (read or wrote) such blocks can commit before all redo for such blocks on all instances is written to disk.

A "data block" is a sequence of bytes or bits. A data block typically contains a whole number of records of a relation (or rows of a table). A data block is stored in a data buffer and is read from and written to persistent storage (e.g., magnetic disks) a whole block at a time, which enables efficient handling of a data stream. Each data block read from or written to persistent storage typically have the same block size, such as 4 KB. Although the following techniques are described in the context of modifying and transferring data blocks, embodiments are not so limited. Other types of data items may be modified and transferred other types of data items that are not read from or written to persistent storage a whole block at a time. Also, other types of data items may not contain a whole number of records, but may contain partial records.

Example Database System

Figure 1:
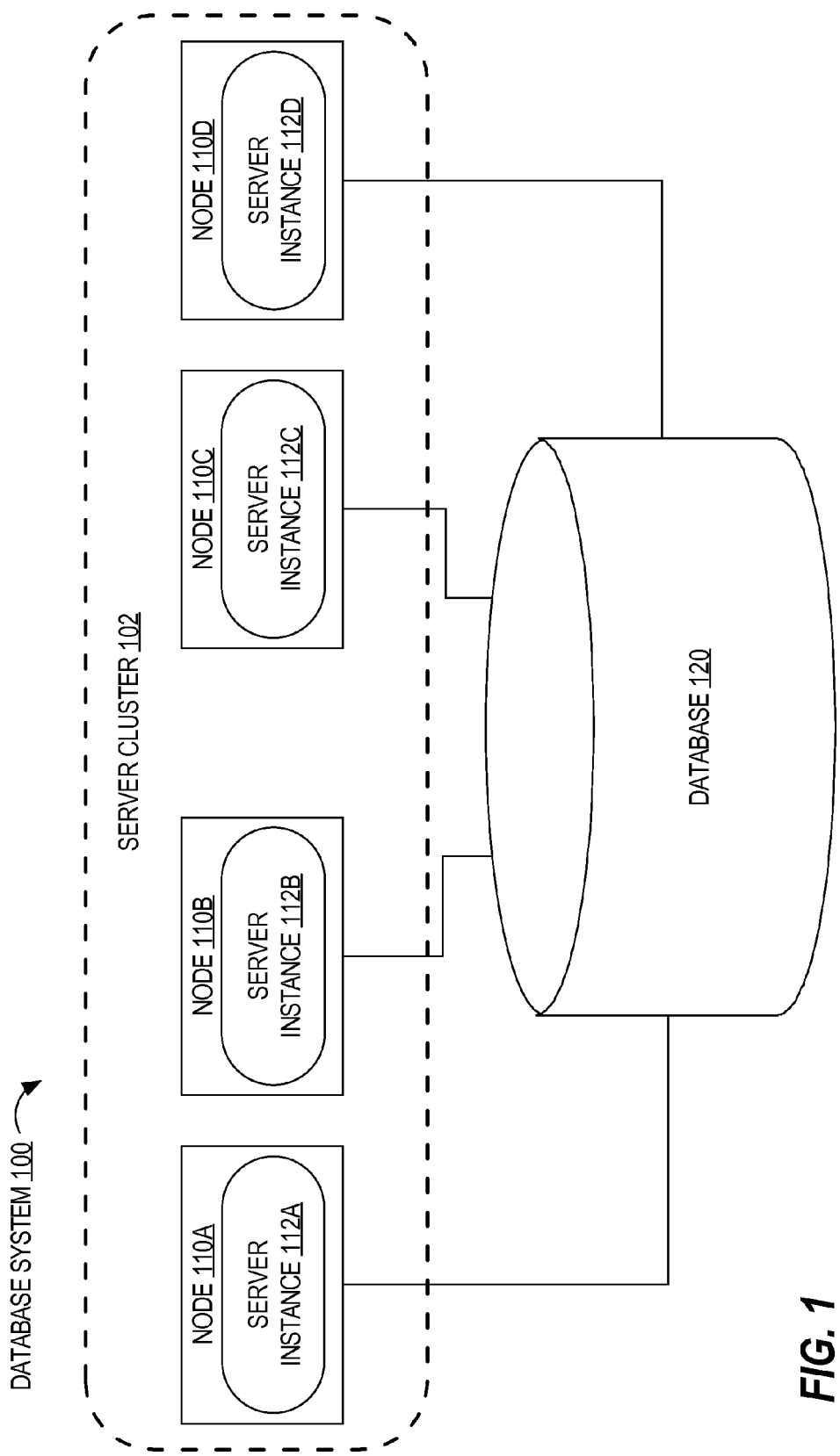
FIG. 1 is a block diagram that depicts an example database system, in an embodiment.

FIG. 1 is a block diagram that depicts an example database system 100, in an embodiment. Database system 100 includes a server cluster 102 and a database 120. Server cluster 102 includes four nodes: nodes 110A-110D. Although four nodes are depicted, server cluster 102 may include two, three, or five or more nodes.

Each node 110 runs or executes a server instance 112. While only one server instance is depicted in each node 110, a node 110 may execute multiple server instances.

Each node 110 includes one or more processors and memory, such as volatile and/or non-volatile memory. Each server instance 112 is implemented in hardware, software, or a combination of hardware and software. Each server instance 112 is configured to respond to client requests for performing one or more database operations, such as a read or query operation and a write operation. The client requests may conform to a particular query language, such as SQL. Each server instance 112 translates client requests into database operations that a storage device that stores database 120 recognizes or is configured to process.

Each node 110 is connected to database 120, which allows each server instance 112 to send requests for data stored in database 120, receive the data, and process the data. Because each server instance 112 has access to the same set of resources in database 120, concurrency control needs to be implemented in order to ensure that, for example, two or more server instances are not modifying (e.g., updating and/or deleting) the same resource at the same time.

Thus, in an embodiment, each server instance 112 is assigned a different set of resources to master. A "master" of a resource is a server instance that maintains lock information for the resource, receives lock requests for the resource, and is the grantor of locks on the resource. The master is responsible for ensuring that no two server instances have conflicting locks on the same resource. For example, while multiple server instances 112 may have a shared lock on resource 34, server instance 112D requests an exclusive lock that is incompatible with the shared locks. Server instance 112D will have to wait until the shared locks are released before the master of resource 34 (e.g., server instance 112A) grants the exclusive lock on resource 34 to server instance 112D.

Although not depicted in FIG. 1, each node 110 is connected to each other node 110 to allow server instances 112A-112D to communicate with each other in order to ensure concurrency control.

In the following description, a data block is an entity in volatile memory of an instance, unless otherwise stated. Different versions of the same data block in persistent storage may exist in volatile memory. For example, there may be multiple consistent-read data blocks in a buffer cache, each data block describing committed data of the same persistent data block as of different timestamps.

Block Change Timestamp

An instance may make one or more changes to the latest version of a data block, such as adding a row to the data block, updating an existing data value in the data block, or deleting a data value from the data block. A change is reflected in a redo record that is generated for the change. A redo record stores information about one or more changes made to a data block. Each redo record is associated with a timestamp (referred to herein as a "block change timestamp") that indicates when the redo record was generated.

In an embodiment, a block change timestamp (and other timestamps referred to herein) is a point from a logical clock in the cluster and is used to order events across the entire cluster. A timestamp does not necessarily reflect a wall-clock time.

The instance creates one or more redo records that record the change(s) made by the instance. The instance may place the one or more redo records in a queue of redo records that are waiting to be "flushed" (or durably stored) in case the instance crashes and the modified data block (which was not "flushed") is lost. The queue of redo records is ordered by the timestamp of the redo records. Thus, the redo records are flushed in order. The redo records are used to recover the data block to a consistent state before the crash.

If an instance does not make any changes to a data block, then the instance does not generate any redo records for that data block. For example, in response to receiving a client request from a client, a holding instance read a data block into memory (either from persistent storage or from another instance), analyze one or more items within the data block, and return requested data to the client. Because no changes are made to the data block, no redo record for the data block is created.

Last Store Timestamp

In an embodiment, each instance in a cluster maintains a timestamp (referred to herein as a "last store timestamp") that indicates all redo records generated by this instance at or below this timestamp have been durably stored. For example, if (1) instance 112A made changes L, M, and N, (2) the associated block change timestamps are, respectively, 12, 15, and 16, and (3) the last store timestamp is 15, then changes L and M have been durably stored. Change N is not guaranteed to be durably stored until instance 112A receives, from a persistent storage system, notification data that indicates all redo at or below timestamp 16 have been durably stored in the persistent storage system. However, even if instance 112A does not receive such notification data before instance 112A fails or crashes, change N may have been durably stored.

Inter-Instance Transfer

A block change timestamp and a last store timestamp are used when transferring a data block from a holding instance to a requesting instance. A "holding instance" is a server instance (in a cluster) that has a data block that includes one or more changes that might not have been durably stored yet. A "requesting instance" is a server instance (in the same cluster) that requests access to the modified data block.

Figure 2:
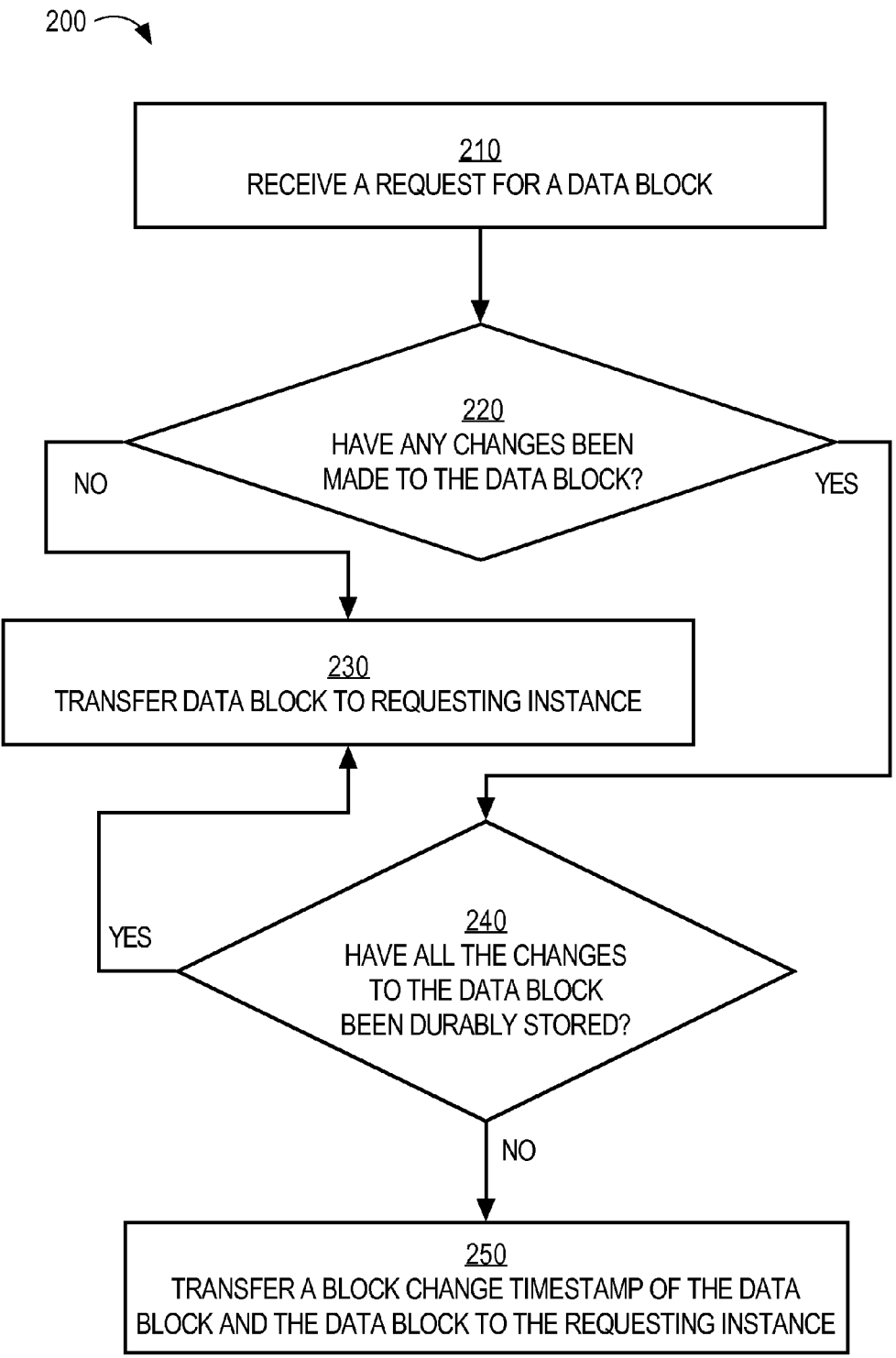
FIG. 2 is a flow diagram that depicts a process for transferring a data block between instances of a cluster, in an embodiment.

FIG. 2 is a flow diagram that depicts a process 200 for transferring a data block between instances of a cluster, in an embodiment. Process 200 is performed by a holding instance.

At block 210, a request for a data block is received from a requesting instance.

At block 220, it is determined whether any changes have been made to the data block and whether any changes are planned to be made to the data block. If not, then process 200 proceeds to block 230, where the data block is transferred to the requesting instance.

If the holding instance has made one or more changes to the data block, then process 200 proceeds to block 240.

At block 240, it is determined whether all of the changes that the holding instance has made to the data block are durably stored. This determination may be performed by the holding instance comparing the block change timestamp of the latest change made to the data block with the last store timestamp. (If multiple changes have been made to a data block, then multiple block change timestamps may have been created for the changes. In that case, the most recent (or latest) block change timestamp is the most relevant.) If the block change timestamp is less than or equal to the last store timestamp, then all the changes made to the data block by the holding instance have been durably stored. Otherwise, at least one change has not been durably stored.

If the determination in block 240 is true, then process 200 proceeds to block 230, where the data block is transferred to the requesting instance (i.e., without sending the block change timestamp).

Alternatively, if the determination in block 240 is false (i.e., at least one change that the holding instance has made to the data block is not durably stored), then process 200 proceeds to block 250.

At block 250, the holding instance sends the block change timestamp and the (modified) data block and to the requesting instance.

The example scenario depicted in FIG. 2 is a simple scenario where, for example, instance 112A makes a change to a data block and transfers the data block to instance 112B. Before instance 112A makes the change, the content of the data block does not reflect any redo that was not durably stored. In this example, when the data block is transferred from instance 112A to instance 112B, the block change timestamp of the redo record generated by 112A is transferred together with the data block.

Dependency Timestamp Array

In an embodiment, a data block is associated with an array of entries, each entry corresponding to a different instance and indicating the highest (i.e., most recent) block change timestamp, generated by the corresponding instance, of redo records on which the data block may depend and that may not have been durably stored. This array is referred to herein as the "dependency timestamp array" or "DT array." Each data block stored in memory of an instance may have an associated DT array, some of which may be empty, indicating that the content of the corresponding data block does not depend on any non-durable redo records.

For example, if instance 112A sends a data block to instance 112B and the data block was modified previously by instance 112C, then instance 112A may send, to instance 112B, the data block and a DT array that includes a block change timestamp in the third position of the DT array (indicating that the data block depends on redo record).

As another example, instance 112A may send, to instance 112B, a data block with a DT array that indicates that the data block does not depend on any non-durable redo records generated by instances 112A-112C, but that the data block does depend on a non-durable redo record generated by instance 112D.

Therefore, a holding instance may send, to a requesting instance, a data block and a DT array that includes multiple block change timestamps, each corresponding to a different instance, which may or may not include the holding instance. For example, instance 112B requests a data block from instance 112A and instance 112A did not make any changes to the data block. However, the data block was modified by instance 112C, from which instance 112A received the data block. Thus, the data block may be associated with a block change timestamp that was created by instance 112C, even though instance 112A did not make any changes to the data block and sends the block change timestamp that was established by instance 112C.

As noted previously, different versions of a data block may reside in memory. Each in-memory data block may be associated with its own DT array.

As noted previously, FIG. 2 depicts a simple example scenario where only a holding instance has made changes to a data block and transfers the data block to a requesting instance without first durably storing redo data that reflects the changes. In an alternative scenario, a holding node transfers, to a requesting node, a data block that is based on non-durable redo records generated by another instance (i.e., other than the holding instance) and, optionally, non-durable redo records generated by the holding instance.

Dependency Between Data Blocks

A data block that includes (or depends on) a redo record that has not yet been durably stored when the data block is transferred to another instance is referred to herein as a "dependent block." After a dependent block is transferred to a particular instance, the particular instance may perform operations on other data blocks based on the dependent block. For example, an instance may read certain data from a dependent block and then update a second data block based on that certain data. Thus, the second data block may be based on changes (i.e., made by another instance to the dependent block) that have not yet been durably stored.

In this example, there is a possibility of critical information dependency between the second data block and the dependent block. Critical information dependency exists when a change to one data block is based on a non-durable redo record of another data block. However, the fact that the second data block is changed based on the dependent block does not guarantee critical information dependency because the DT array of the dependent block does not indicate which data values were changed in the dependent block, only that the dependent block was changed and the corresponding redo changes were not durably stored prior to transmission of the dependent block from one instance to another. For example, row 1 in a dependent block may have a non-durable redo record. Then, another instance reads row 2 in the dependent block and updates a value in a second data block based on row 2. In this example, while there is no actual critical information dependency, the second data block is considered to be dependent on the dependent block. Tracking changes at the level of rows or other small data items may be too complex and/or process intensive to implement.

Therefore, in an embodiment, a DT array of a dependent block is propagated to a second data block if there is a possibility of critical information dependency between the second data block and the dependent block. For example, if the DT array of a dependent block includes the values, 15, 17, and 21 (each corresponding to a different instance) and an instance modifies a second data block based on the dependent block, then a DT array (which may initially be empty) for the second data block is updated to include the values 15, 17, and 21.

Transaction Dependency Timestamp Array

In an embodiment, an instance maintains a transaction dependency timestamp array (or "transaction DT array") for each transaction in order to keep track of all the non-durable redo records associated with the transaction. Each entry in the transaction DT array corresponds to a different instance of a cluster (e.g., server cluster 102). Each entry in the transaction DT array includes the maximum of the corresponding block change timestamps of DT arrays of the data blocks that were read and written by the corresponding transaction. For example, if transaction X reads data blocks A, B, and C and the DT arrays of data blocks A, B, and C are {3, 4, 9}, {5, 2, 10}, and {4, 8, 6}, then the transaction DT array would be {5, 8, 10}.

Then, if a transaction makes a change to a data block, the transaction DT array of the transaction (if one exists) is copied to the DT array of the data block. For example, if a transaction DT array is {23, 28, 19, 31} and the DT array of a data block that is being written to is {24, 27, 22, 28}, then the resulting DT array of the data block would be {24, 28, 22, 31}. If the data block does not have a DT array (indicating that the data block does not depend on any non-durable redo records) then a DT array is created for the data block and the values in the transaction DT array are copied into the DT array.

Embodiments are not limited to transaction-only changes. For example, a database system may allow data blocks to be read and modified outside of a transaction. However, data blocks are usually read and modified within a database session. In such cases, instead of maintaining a transaction DT array, a session timestamp array is created and maintained for the duration of a session, which may include multiple transactions. A session timestamp array is modified and maintained in the same way described above with respect to a transaction DT array.

Durability Check

Sometime after a requesting instance receives a dependent block, the previous holding instance (presuming it does not crash) durably stores any previously non-durable redo records associated with the dependent block. In other words, the last store timestamp associated with an instance is progressively updated as redo that reflects changes made by the instance to data blocks are durably stored. This means that non-durable redo records eventually become durable. Thus, an instance may perform a "durability check" to determine whether any non-durable redo records associated with the dependent block have been durably stored. In order to perform a durability check, a previous holding instance transmits a last store timestamp to a current holding instance. The current holding instance compares the last store timestamp associated with the previous holding instance with the corresponding block change timestamp of the dependent block. If the last store timestamp is greater than or equal to the corresponding block change timestamp of the dependent block, then the corresponding block change timestamp may be deleted or removed, indicating that the dependent block no depends on non-durable redo records from the previous holding instance. However, the DT array of the dependent block may indicate that the dependent block depends on non-durable redo records from other instances in the cluster.

For example, if a DT array of a dependent block in instance 112B is {19, , 17, }, dependent block, and the last store timestamp received at instance 112B from instance 112A is 20, then the DT array is updated to become {, , 17, } (because 20 is greater than or equal to 19). In this example, the DT array indicates that the dependent block may contain one or more non-durable changes from instance 112C (corresponding to the third entry in the DT array). If the last store timestamp received at instance 112B from instance 112A is 18, then the DT array would remain the same, until a last store timestamp received from an instance is greater than the corresponding block change timestamp in the DT array.

In an embodiment, each instance in a cluster frequently broadcasts a last store timestamp (associated with that instance) to each other instance in the cluster. In this way, each instance in the cluster may maintain up-to-date information on which non-durable redo records have been made durable. An instance may broadcast a last store timestamp each time a redo record is durably stored. Alternatively, an instance may broadcast a last store timestamp periodically (e.g., every second), regardless of how many redo records generated by the instance have been durably stored.

A durability check may be performed periodically or before certain events. For example, a durability check may be performed every two seconds, before a transaction reads a data block, and before a transaction generates redo records for the data block.

Generating Redo

If an instance makes a change to a data block that contains non-durable changes (i.e., a dependent block), then the instance generates a redo record that records the change. Additionally, the instance stores block change timestamp data in (or in association with) the redo record. The block change timestamp data may be the DT array of the data block or a subset of the values in the DT array.

If a redo record stores changes from multiple data blocks, then the DT array of the redo record is a copy of the transaction DT array of the transaction in which the changes were made. Each entry in the DT array of the redo record is the maximum timestamp of all data blocks touched by the transaction, not just data locks referred to by the redo record.

In an embodiment, instances in a cluster employ a compression technique in which a redo record stores a strict subset of a transaction's DT array. For example, a redo record may be configured to only store two block change timestamps when the redo record is initially associated with three block change timestamps. Before the redo record is stored, the last store timestamps of one or more other instances are checked to determine whether the non-durable redo records(s) associated with the data block(s) identified by the redo record have been durably stored. In other words, a durability check is performed with respect to the DT array associated with the redo record. Thus, if one or more block change timestamps (associated with the redo record) are less than or equal to the corresponding last store timestamps, then those one or more block change timestamps are deleted or removed. If the number of remaining block change timestamps associated with the redo record is less than a threshold number (e.g., three), then the remaining block change timestamps are recorded in the redo record and the redo record is ready to be durably stored. Otherwise, another durability check is performed until the number of remaining block change timestamps associated with the redo record is less than a threshold number (e.g., three).

A redo record may not only store the block change timestamp of a non-durable redo record but also an instance identifier of the instance that generated the non-durable redo record. Thus, if a redo record is configured to store no more than two BCTs, then the redo record will also store two instance identifiers, one for each BCT. If a redo record stores all BCTs associated with a data block (even when some BCTs are null, indicating that there is no non-durable redo record, associated with the corresponding instance, on which the data block depends), then the redo record does not need to store instance identifiers. Instead, the position of each BCT relative to each other corresponds to a particular instance. For example, the first BCT in a redo record corresponds to instance 112A, the second BCT in the redo record corresponds to instance 112B, and so forth.

The foregoing compression technique may also be applied to data block and transaction DT arrays, in which case an instance may have to wait before (a) transferring a data block to another instance, (b) changing the data block, or (c) a transaction touching (e.g., reading) the data block.

Committing a Transaction

Write-ahead logging is a logging paradigm that follows two principles: (1) redo for a data block must be durably stored before the data block is durably stored and (2) redo for a data block must be durably stored before the transaction or session in which the data block was changed is committed or ends.

In light of the techniques described above regarding inter-instance transfer of data blocks prior to durably storing the changes to the data blocks, the write-ahead logging paradigm follows two additional principles: (1) before a data block is durably stored, not only does the redo for the data block need to be durably stored, all the changes on which the data block depends (i.e., "dependencies") must be durably stored; and (2) before a transaction is committed (or a session ends), not only must the redo created by the transaction be durably stored, all the dependencies that the transaction depends on must be durably stored.

Regarding additional principle (1), if a database system crashes after a data block is durably stored but before the dependencies are durably stored, then the recovery process may fail. Thus, before a data block in memory can be written to persistent storage, the DT array associated with the data block must be empty (due to a durability check).

Regarding additional principle (2), if a transaction committed prior to ensuring that dependencies were durably stored on other instances, then a recovery process may fail. For example, if instance 112A made a particular change to a data block, transferred the data block to instance 112B along with a BCT, a transaction on instance 112B committed changes to the data block (or another data block that depends on the data block), and instance 112A failed prior to the particular change being durably stored, then database consistency is broken. The effect of the instance crash would be a redo change on which the committed transaction depended has been lost, making recovery unable to recover the committed transaction since that would require recovery to apply the missing redo change.

Therefore, in an embodiment, before a transaction commits, the transaction compares its transaction DT array with the last store timestamp array maintained on the corresponding instance. In order to commit the transaction, each transaction timestamp must be less than or equal to the corresponding last store timestamp. For example, if a transaction DT array is {23, 19, 22, 24} and a last store timestamp array is {23, 20, 23, 24}, then the transaction can commit. However, if the last store timestamp is {23, 20, 21, 24}, then the transaction cannot commit and the transaction will have to wait until the last store timestamp of the third instance is greater than or equal to 22.

Example Scenario

FIG. 3A-3F are block diagrams that depict an example scenario of a data block that depends on non-durable redo records and that is transferred among instances of a cluster, in an embodiment.

Figure 3A:
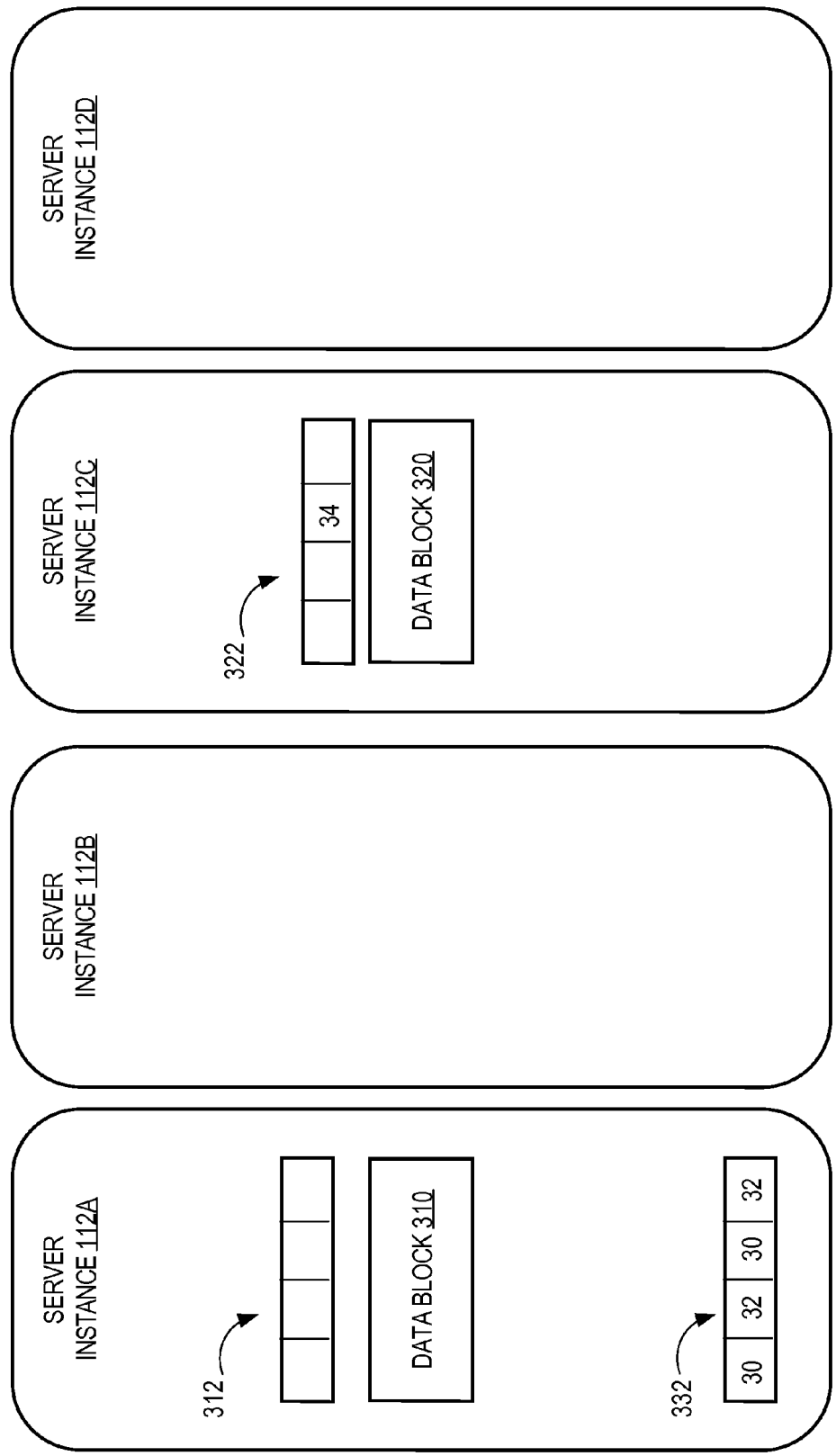
FIG. 3A-3F are block diagrams that depict an example scenario of a data block that depends on non-durable redo records and that is transferred among instances of a cluster, in an embodiment.

In FIG. 3A, instance 112A requests a data block 310 from persistent storage. At this point, the data block 310 does not depend on any non-durable redo records. Thus, DT array 312 is empty.

Instance 112A also stores a last store timestamp array 332 that indicates, for each instance in the cluster, a last store timestamp of the instance.

Figure 3B:
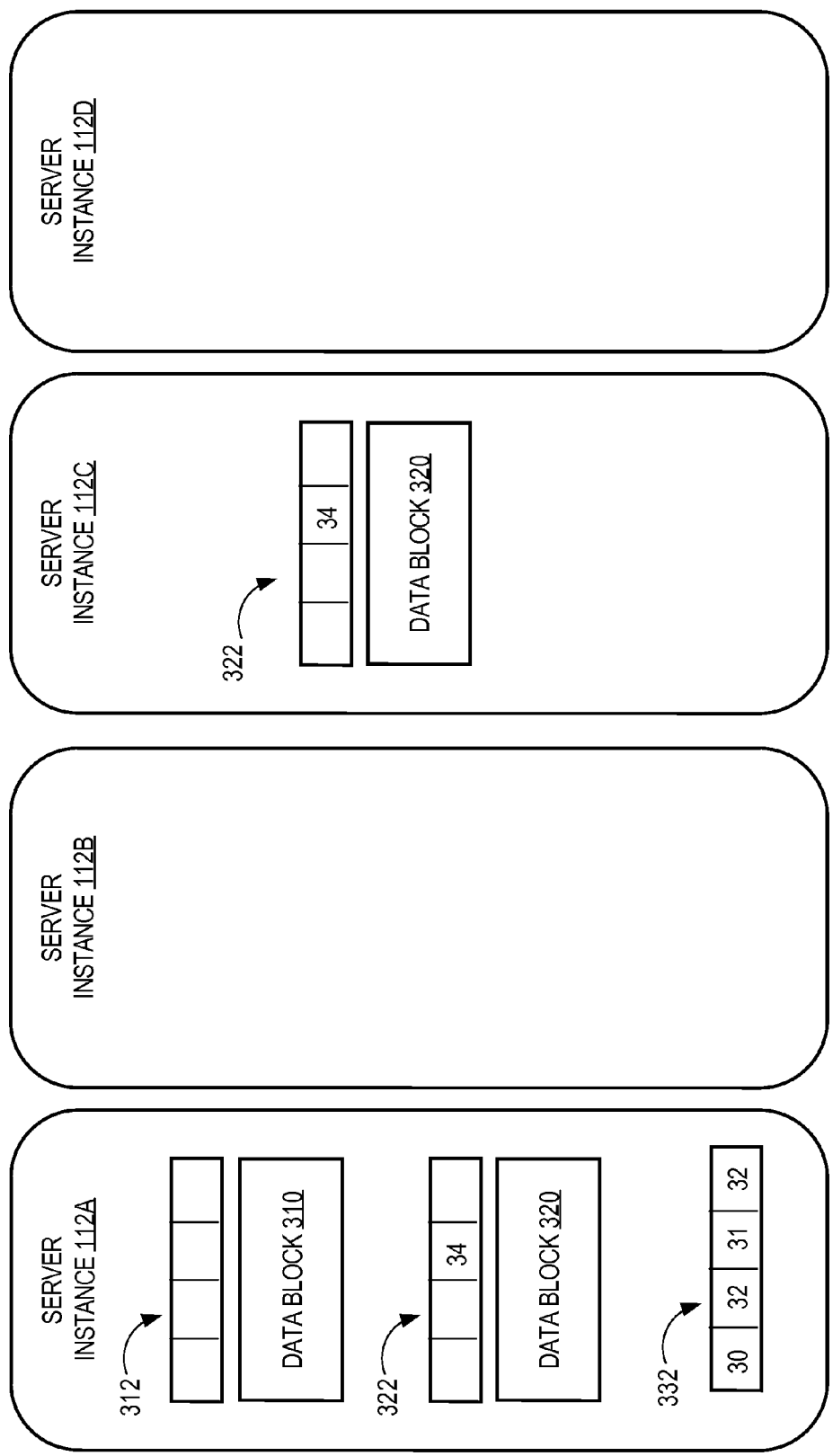

Instance 112A requests a data block 320 from instance 112C. Instance 112C sends, to instance 112A, data block 320 and a DT array 322 associated with data block 320. DT array 322 indicates that data block 322 depends on a non-durable redo record generated by instance 112C. Instance 112C also sends a last store timestamp of instance 112C. In response, instance 112A updates last store timestamp array 332 of instance 112A that indicates the last store timestamp of each instance in the cluster. In this example, the last store timestamp of instance 112C is 31, which is later than the last store timestamp (i.e., 30) of instance 112C previously stored. FIG. 3B depicts the example scenario after data block 320 and DT array 322 have been transferred to instance 112A and after last store timestamp array 332 has been updated.

Figure 3C:
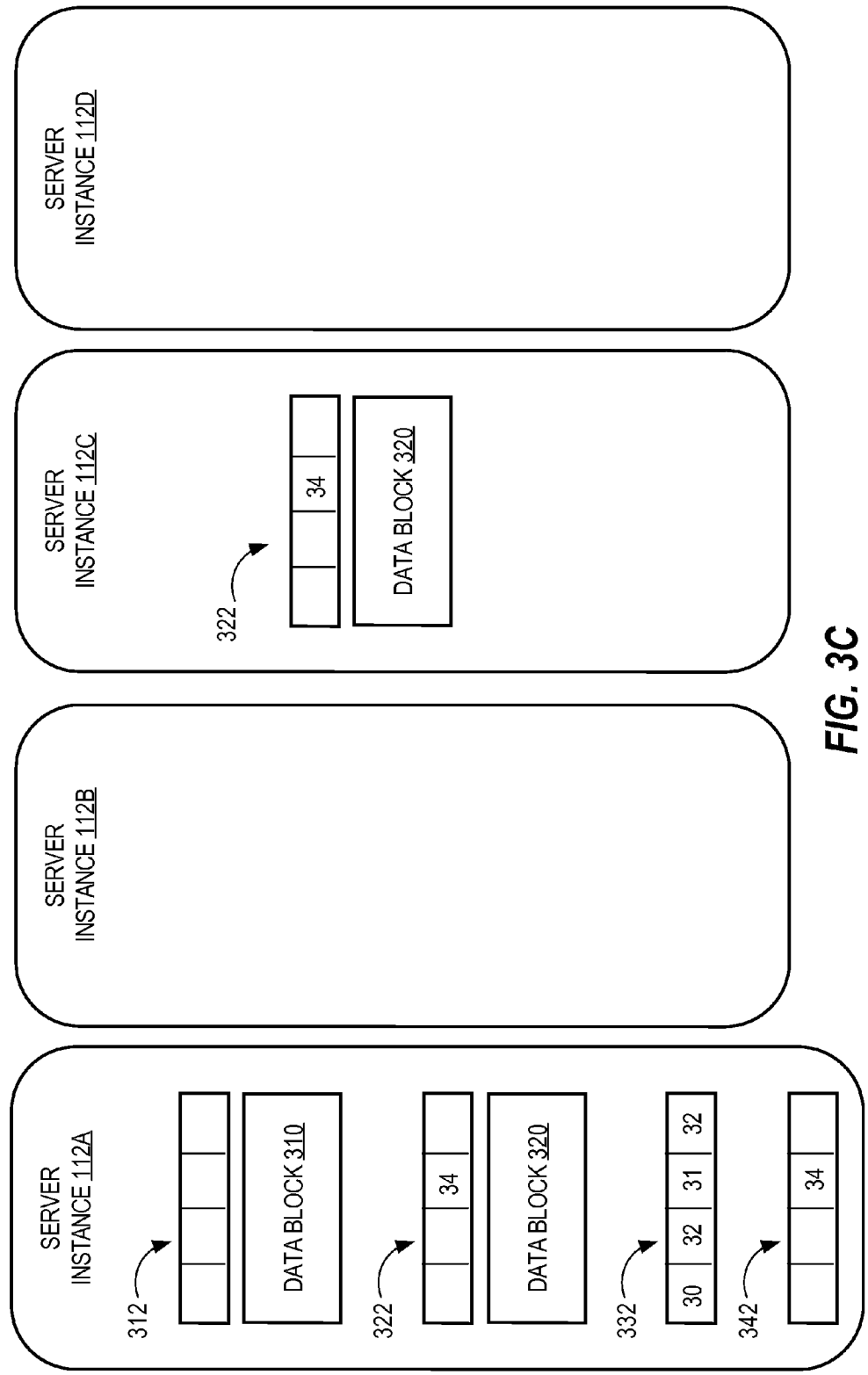

Instance 112A reads data from data block 320. As a result, a transaction DT array 342, which is initially empty, is updated to include DT array 322 of data block 320. FIG. 3C depicts the example scenario after data block 320 has been read by a transaction on instance 112A.

Figure 3D:
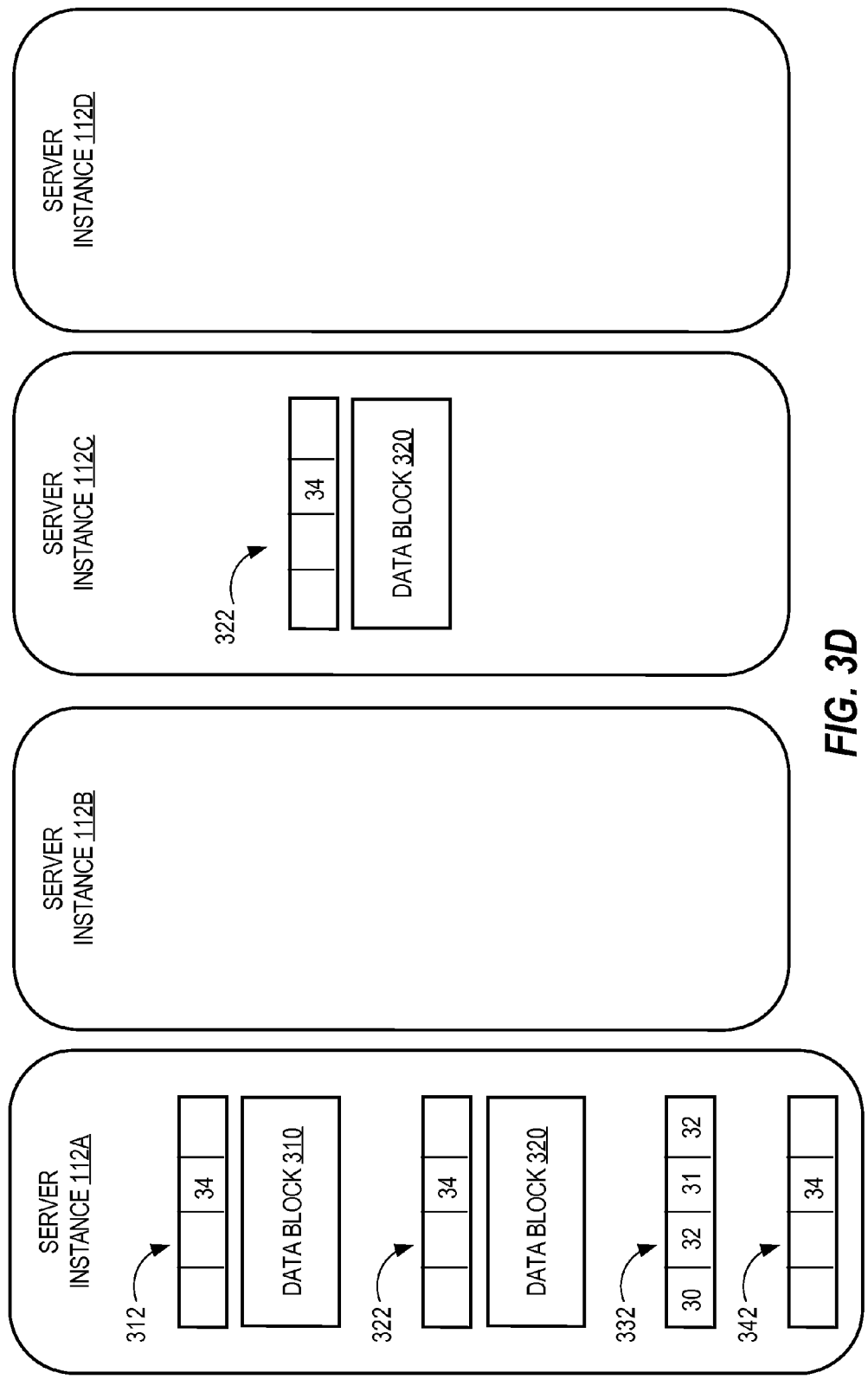

Instance 112A then updates data block 310 based on data read from data block 320. As a result, instance 112A updates DT array 312 (which was initially empty) with transaction DT array 342. Instance 112A generates a redo record that indicates one or more changes made by instance 112A to data block 310. The redo record includes a BCT that indicates when the redo record was generated. FIG. 3D depicts the example scenario after data block 310 has been updated within the transaction and DT array 312 has been updated.

Figure 3E:
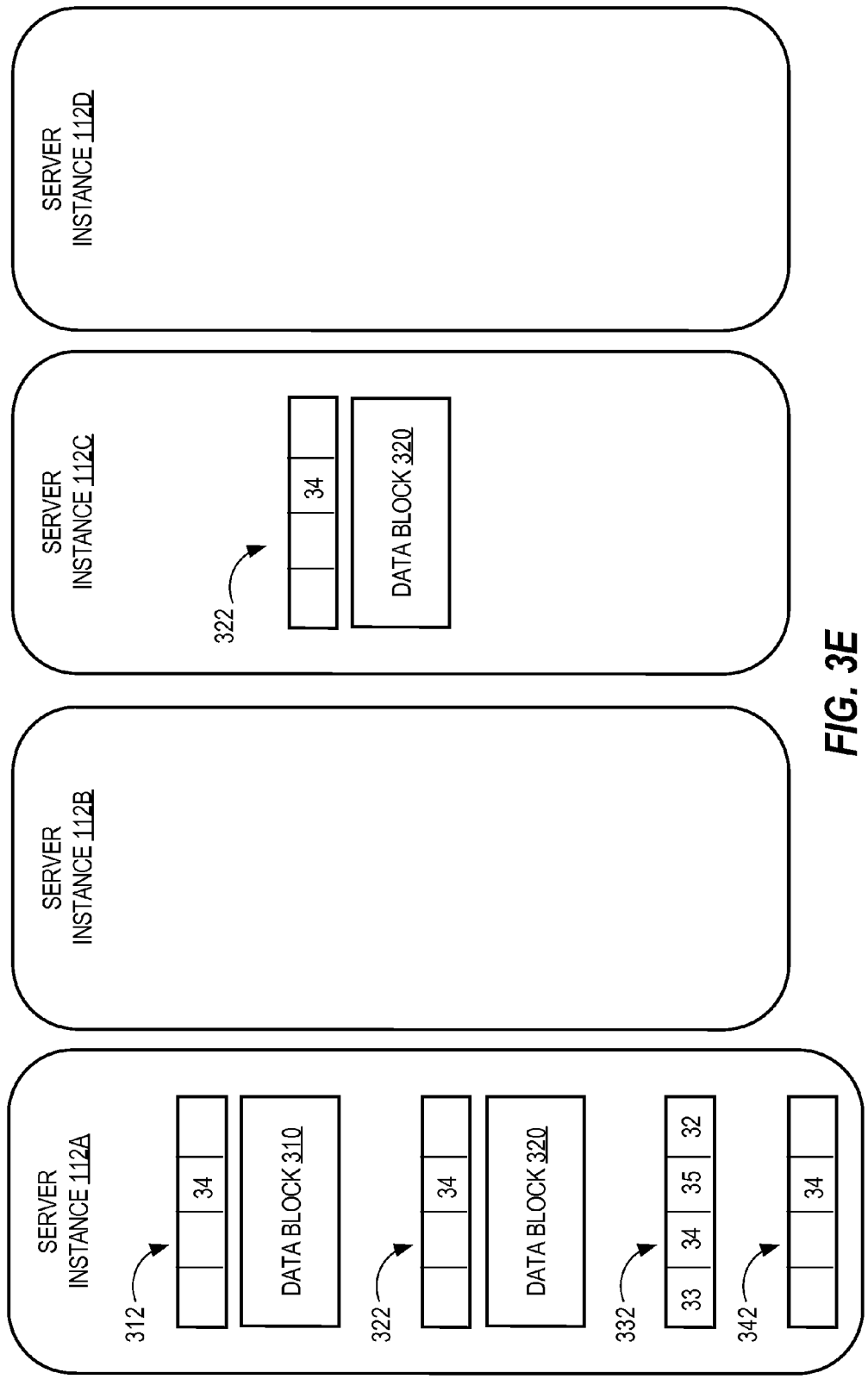

FIG. 3E depicts the example scenario after instance 112A receives last store timestamps from instances 112B and 112C and after the last store timestamp of instance 112A has been updated. Thus, last store timestamp array 332 is updated to reflect the new last store timestamp values.

Instance 112A receives, from instance 112B, an inter-instance transfer request for data block 310. Prior to transferring data block 310, instance 112A performs a durability check. Instance 112A determines, based on last store timestamp array 332, that the non-durable redo records generated by instance 112C have been durably stored. In response, instance 112A updates DT array 312 of data block 310 to remove the BCT corresponding to instance 112C and then transfers data block 310 and DT array 312 to instance 112B.

Instance 112A also updates the first element of DT array 312 if the redo for the last change is not durably stored. Instance 112A compares the timestamp associated with that redo record (which timestamp is the system timestamp at the time data block 310 was updated and is stored separately from DT array 312) and the first entry of last store time timestamp array 332. If the first entry in array 332 is lower, then the last change timestamp is stored in the first element of DT array 312, which is passed with data block 310.

Figure 3F:
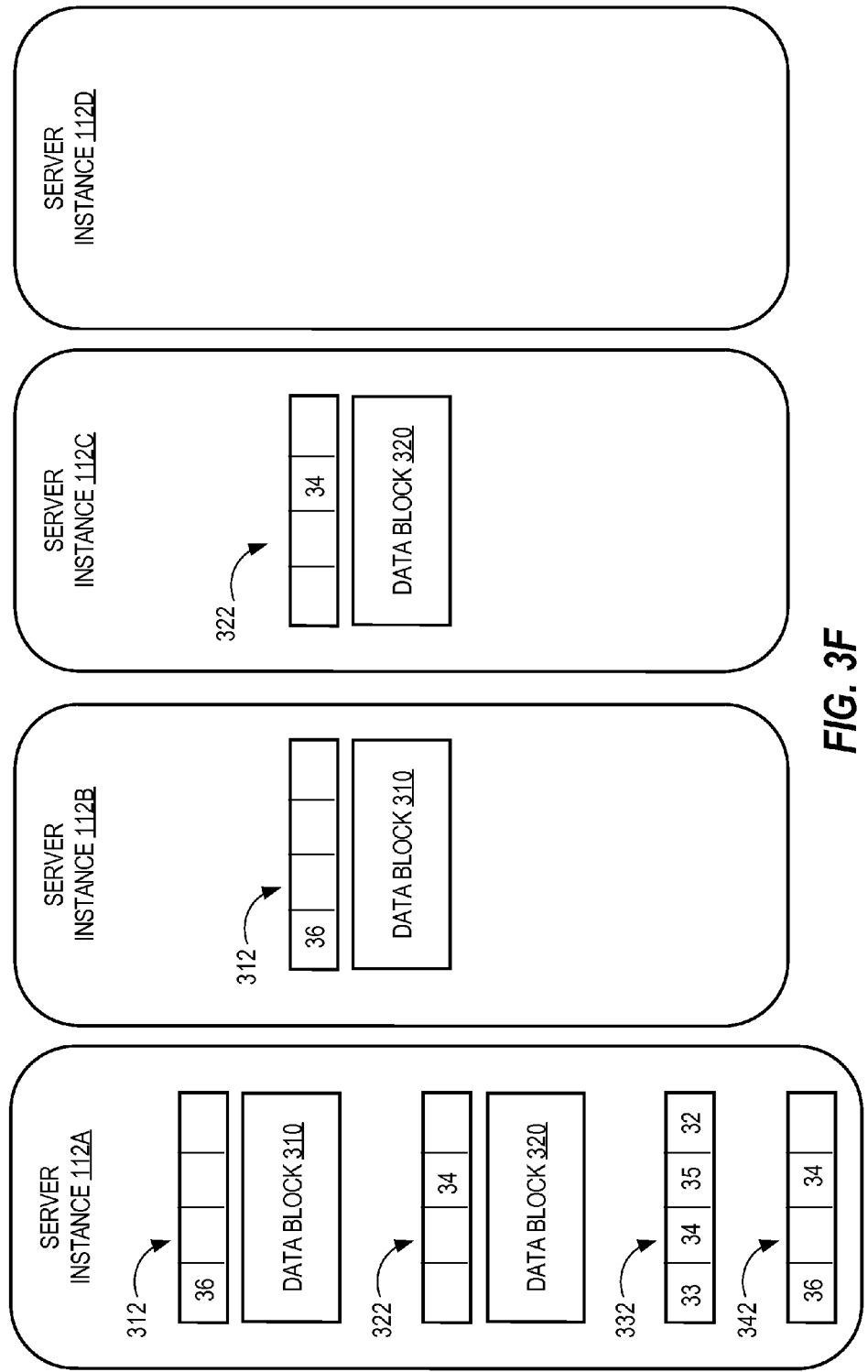

FIG. 3F depicts the example scenario after DT array 312 has been updated and DT array 312 and data block 310 have been transferred to instance 112B.

Eventually, instance 112A determines whether the transaction that updated data block 310 can commit. This determination involves determining whether all of the non-durable redo records on which the transaction depends have been durably stored. The transaction can commit if, for each instance indicated in transaction DT array 342, the last store timestamp of the instance is greater than or equal to the corresponding BCT value in transaction DT array 342. In the example of FIG. 3F, the transaction cannot commit until the last store timestamp of instance 112A (indicated in last store timestamp array 332) is greater than or equal to 36.

Instance Crash Recovery

If an instance crashes or otherwise fails, then a recovery process for the instance is initiated. A recovery process involves a surviving instance (i.e., one that did not crash) applying redo records from a redo log associated with the failed instance to the corresponding data blocks.

In an embodiment, a surviving instance determines the last store timestamp of the failed instance, which may be different than the last store timestamp that each surviving instance stores for the failed instance. The surviving instance sends the last store timestamp to each other surviving instance along with notification data that indicates that the failed instance has crashed. Each surviving instance uses the notification data and the last store timestamp of the failed instance to determine whether to abort a transaction (or session) that has a corresponding transaction timestamp that is greater than the last store timestamp of the failed instance.

For example, instance 112A fails and instance 112B determines that the last store timestamp of instance 112A is 54. Instance 112B broadcasts '54' to instances 112C and 112D. Instance 112C is executing a transaction that has a transaction timestamp of 56 for instance 112A. This means that the transaction depends on changes that were made by failed instance 112A, but that were not durably stored. Because '56' is greater than '54', instance 112C aborts the transaction. The transaction could not have been committed when this comparison is performed because transactions cannot commit (or sessions cannot end) until the last store timestamp is greater than or equal to the corresponding transaction/session timestamp, indicating that changes that the transaction/session depend on have been durably stored.

There may be other transactions and/or sessions on instance 112C that need to be aborted. Additionally, instances 112B and 112D also perform the comparison between the last store timestamp of the failed instance (i.e., '54') and the corresponding transaction/session timestamps.

Instance crash recovery also involves scanning the memory cache of each surviving instance. If a data block in a memory cache has a DT array entry (corresponding to the failed instance) that is later than the last store timestamp of the failed instance, then the data block is rolled back to a previous version that does not depend on any redo records generated by the failed instance and were lost due to the instance crash.

In an alternative embodiment, instead of identifying transactions on surviving instances to abort, a surviving instance is crashed automatically. In this embodiment, each instance has a DT array, where each entry is the maximum of the corresponding entry of each dependent block that the surviving instance ever received. For example, instance 112B receives three dependent blocks with the following DT arrays: {54, 57, 55, 58}, {53, 54, 55, 59}, {55, 56, 56, 58}. The DT array for instance 112B would then be {55, 57, 56, 59}. If instance 112A (which corresponds to the first entry in the DT array) fails, then instance 112B compares the last store timestamp of instance 112A with 55. If the last store timestamp is less than 55, then instance 112B is crashed.

The DT array of an instance may be updated when the instance receives a data block transferred from another instance. The data block transfer may carry (1) the DT array of the data block that used to exist on the sender's instance and (2) BCT information generated by the sender instance's for the data block. The DT array of an instance may also be updated by the instance performing a durability check where some of the timestamps of an instance's DT array are cleared if a last store timestamp is greater than its corresponding DT array entry.

System Crash Recovery

It is possible that the entire database system crashes, meaning that all instances in a cluster fail. In this scenario, the redo logs of each (failed) instance are analyzed in timestamp order to recover the database system to a consistent state. However, as in the single instance crash scenario, if the database system implements an inter-instance block transfer approach described herein where dependent blocks are transferred before the corresponding redo records upon which the dependent blocks depend are durably stored, then the recovery process may discover a redo record that depends on a change that was not durably stored.

For example, instance 112B durably stored a redo record that indicates a second change to a data block that depends on a first change made by instance 112A. The block change timestamp associated with the first change is 78 and the last store timestamp associated with instance 112A is 76. Therefore, the first change was never durably stored. Thus, it is as if the first change never happened. In this example, the redo record is ignored. In other words, the second change is not applied to the data block.

A recovery process may first analyze each redo log of each failed instance and identify the latest block change timestamp that was durably stored. If redo records of an instance are stored in the order in which the instance created the redo records, then the last redo record in the instance's redo log should have the latest (or highest) timestamp.

The recovery process may then merge the redo logs of each instance by the order of timestamp as of which the redo records were generated. Afterward, each redo record is applied to the appropriate data blocks.

Before applying a redo record to a block, the recovery process determines whether the redo record includes dependency information. If so, the recovery process identifies one or more instances upon which the redo record depends. For example, a redo record may indicate that a change of the redo record depends on instance 112A and instance 112C and the change timestamps associated with the two instances are, respectively, 88 and 86. The recovery process determines whether the last store timestamps of instances 112A and instances 112C are both after the corresponding change timestamps. If so, then the redo record may be applied to a data block. If not, then the redo record is discarded or ignored. For example, the last store timestamps of instances 112A and 11C may be, respectively, 87 and 89. Even though 86 is before 89, 88 is not before 87.

Media Recovery

When a database, or part of a database, suffers media failure, the database system may need to perform "media recovery" to apply historical redo changes generated by all database instances in timestamp order onto old backups of the database or part of the database, either up to a particular point-in-time, or up to all redo that was ever generated by the database.

Media recovery can also happen in the context of standby database, where a particular database (referred to as a "primary database") has a standby database that applies redo records from all instances of the particular database in timestamp order to catch up with the primary database. If the primary database fails, the standby database can transition into a primary database after applying all necessary redo.

A media recovery process may also encounter redo records with BCT information. When such a redo record is encountered, the media recovery process determines whether the dependencies described by the DT array are durable. If not, then the redo record is discarded. For example, if the DT array associated with a redo record generated by instance 112B indicates that it depends on the timestamp 20 from instance 112A, and the current redo log from instance 112A as being read by a media recovery process indicates that there was no redo associated with timestamp 20 durably stored, then the redo record from instance 112B is discarded by the media recovery process.

Thus, in instance, system, and media recovery scenarios, each recovery process may determine whether to skip or ignore a first redo record that depends on a second redo record by, for example, comparing a BCT in the first redo record with the last store timestamp of the instance that generated the second redo record.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
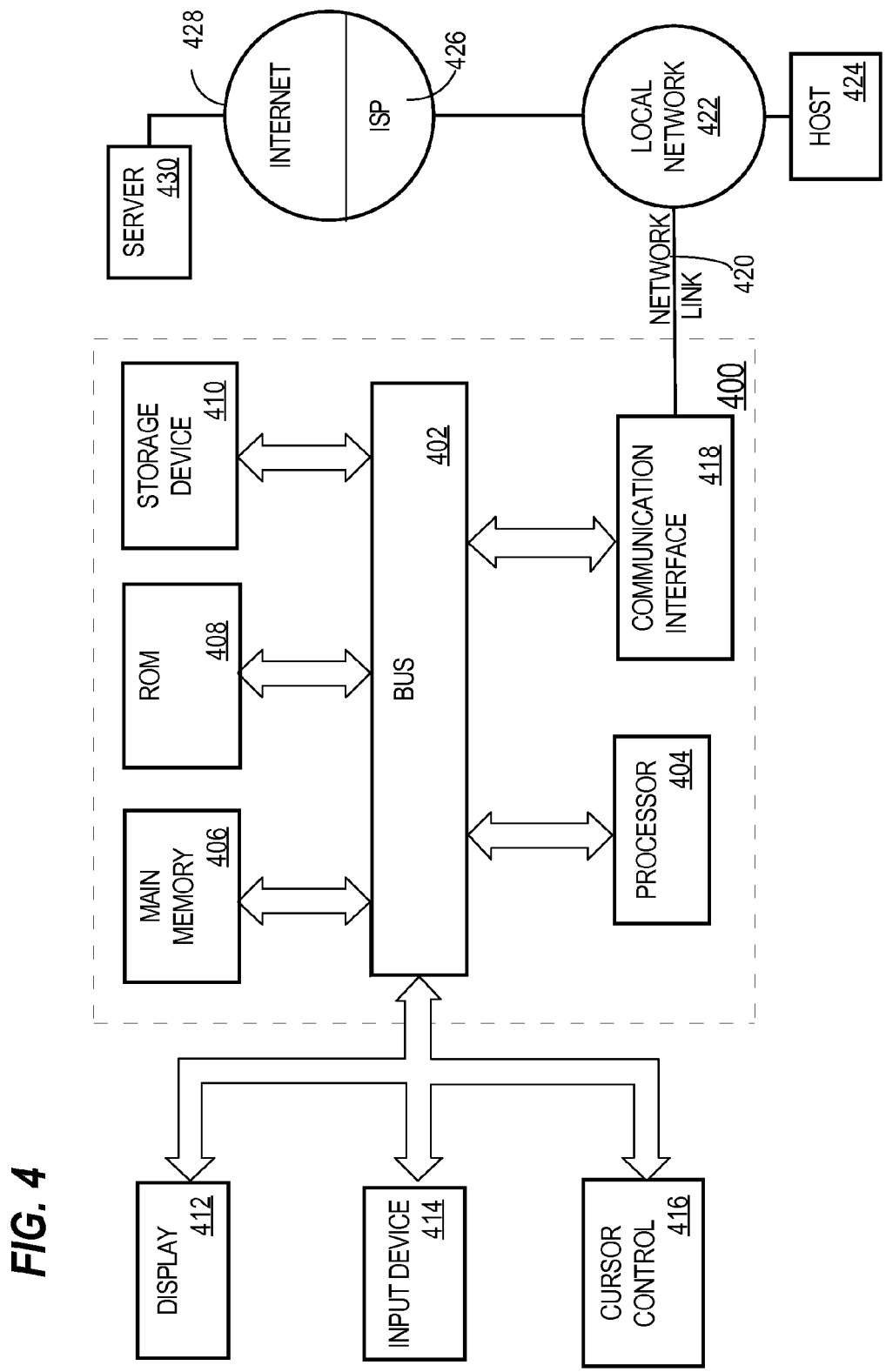
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404. Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    receiving, at a first node in a cluster of nodes of a database system, from a second node in the cluster of nodes, a request for first data that the first node has modified;
    wherein each node in the cluster of nodes executes one or more database server instances;
    prior to the first node durably storing redo data that indicates one or more changes that have been made to the first data, sending, from the first node, to the second node in the cluster of nodes, the first data that includes the one or more changes;
    wherein sending the first data comprises sending timestamp data that indicates when the redo data was generated at the first node;
    wherein sending the timestamp data to the second node comprises sending, to the second node, a plurality of timestamp values;
    wherein each timestamp value of the plurality of timestamp values indicates when certain redo data, upon which the first data depends, was generated by a different respective instance of a plurality of instances in the cluster of nodes;
    wherein the method is performed by one or more computing devices.

2. The method of claim 1, further comprising:
    making, at the second node, one or more second changes to the first data;
    after making the one or more second changes:
        durably storing second redo that indicates the one or more second changes;
        durably storing the timestamp data in association with the second redo.

3. A method comprising:
    receiving, at a first node in a cluster of nodes of a database system, from a second node in the cluster of nodes, a request for first data that the first node has modified;
    wherein each node in the cluster of nodes executes one or more database server instances;
    prior to the first node durably storing redo data that indicates one or more changes that have been made to the first data, sending, from the first node, to the second node in the cluster of nodes, the first data that includes the one or more changes;
    wherein sending the first data comprises sending timestamp data that indicates when the redo data was generated at the first node;
    making, at the second node, based on the first data, one or more second changes to second data that is different than the first data;
    after making the one or more second changes:
        durably storing second redo that indicates the one or more second changes;
        durably storing the timestamp data in association with the second redo.

4. A method comprising:
    receiving, at a first node in a cluster of nodes of a database system, from a second node in the cluster of nodes, a request for first data that the first node has modified;
    wherein each node in the cluster of nodes executes one or more database server instances;
    prior to the first node durably storing first redo data that indicates one or more changes that have been made to the first data, sending, from the first node, to the second node in the cluster of nodes, the first data that includes the one or more changes;
    storing, on the second node, last store timestamp data that indicates when particular redo data, made by the first node, was durably stored, wherein the particular redo data is the most recent redo, generated by the first node, that was durably stored;
    storing, on the second node, change timestamp data that indicates when the first redo data was generated by the first node;
    making, at the second node, one or more second changes to second data;
    prior to durably storing second redo data that indicates the one or more second changes, comparing the change timestamp data with the last store timestamp data.

5. The method of claim 4, further comprising:
    determining that the last store timestamp data indicates a time that is prior to a time indicated by the change timestamp data;
    in response to determining that the last store timestamp data indicates a time that is prior to a time indicated by the change timestamp data, storing the change timestamp data in association with the second redo.

6. The method of claim 4, further comprising:
    determining that the last store timestamp data indicates a time that is after a time indicated by the change timestamp data;
    in response to determining that the last store timestamp data indicates a time that is not prior to a time indicated by the change timestamp data, durably storing the second redo data without storing the change timestamp data in association with the second redo data.

7. A method comprising:
    receiving, at a first node in a cluster of nodes of a database system, from a second node in the cluster of nodes, a request for first data that the first node has modified;

wherein each node in the cluster of nodes executes one or more database server instances;

prior to the first node durably storing redo data that indicates one or more changes that have been made to the first data, sending, from the first node, to the second node in the cluster of nodes, the first data that includes the one or more changes;

reading, by a transaction on the second node, second data that is associated with second change timestamp data that indicates when second redo data, that indicates one or more second changes that were made to the second data by a third node in the cluster of nodes, was generated by the third node;

in response to reading the second data, storing the second change timestamp data in association with the transaction;

reading, by the transaction, third data that is associated with third change timestamp data that indicates when third redo data, that indicates one or more third changes were made to the third data by the third node, was generated by the third node;

in response to reading the third data, comparing the second change timestamp data to the third change timestamp data;

replacing the second change timestamp data with the third change timestamp data if a time indicated by the third change timestamp data is later than a time indicated by the second change timestamp data.

8. A method comprising:

receiving, at a first node in a cluster of nodes of a database system, from a second node in the cluster of nodes, a request for first data that the first node has modified;

wherein each node in the cluster of nodes executes one or more database server instances;

prior to the first node durably storing redo data that indicates one or more changes that have been made to the first data, sending, from the first node, to the second node in the cluster of nodes, the first data that includes the one or more changes;

determining that a first instance on the first node has failed;

determining a last store timestamp associated with the first instance, wherein the last store timestamp indicates when the latest redo data that was generated by the first instance was durably stored;

determining that a second instance that is different than the first instance executes a transaction that is associated with a change timestamp that is associated with the first instance;

determining to abort the transaction if the change timestamp is later than the last store timestamp.

9. A method comprising:

receiving, at a first node in a cluster of nodes of a database system, from a second node in the cluster of nodes, a request for first data that the first node has modified;

wherein each node in the cluster of nodes executes one or more database server instances;

prior to the first node durably storing redo data that indicates one or more changes that have been made to the first data, sending, from the first node, to the second node in the cluster of nodes, the first data that includes the one or more changes;

determining that the cluster of nodes failed;

determining a last store timestamp that indicates when the latest redo data that was generated by a particular instance in the cluster of nodes was durably stored by the particular instance in the cluster of nodes;

identifying a change timestamp associated with a redo record that is associated with second data, wherein the change timestamp indicates when particular redo data was generated by the particular instance, wherein the second data depends on the particular redo data;

determining whether to apply the redo record to the second data by comparing the last store timestamp with the change timestamp.

10. A method comprising:

receiving, at a first node in a cluster of nodes of a database system, from a second node in the cluster of nodes, a request for first data that the first node has modified;

wherein each node in the cluster of nodes executes one or more database server instances;

prior to the first node durably storing redo data that indicates one or more changes that have been made to the first data, sending, from the first node, to the second node in the cluster of nodes, the first data that includes the one or more changes;

determining that a database, to which each node in the cluster of nodes has access, has suffered a media failure;

applying redo data from each node in the cluster of nodes to a backup of the database;

wherein applying the redo data comprises:
  determining whether a first redo record, upon which a second redo record depends, has been durably stored;
  in response to determining that the first redo record has not been durably stored, discarding the second redo record without applying the second redo record to the backup.

11. One or more non-transitory storage media storing instructions which, when executed by one or more processors, cause:

receiving, at a first node in a cluster of nodes of a database system, from a second node in the cluster of nodes, a request for first data that the first node has modified;

wherein each node in the cluster of nodes executes one or more database server instances;

prior to the first node durably storing redo data that indicates one or more changes that have been made to the first data, sending, from the first node, to the second node in the cluster of nodes, the first data that includes the one or more changes;

wherein sending the first data comprises sending timestamp data that indicates when the redo data was generated at the first node;

wherein sending the timestamp data to the second node comprises sending, to the second node, a plurality of timestamp values;

wherein each timestamp value of the plurality of timestamp values indicates when certain redo data, upon which the first data depends, was generated by a different respective instance of a plurality of instances in the cluster of nodes.

12. The one or more storage media of claim 11, wherein the instructions, when executed by the one or more processors, further cause:

making, at the second node, one or more second changes to the first data;

after making the one or more second changes:
  durably storing second redo that indicates the one or more second changes;
  durably storing the timestamp data in association with the second redo.

13. One or more storage media storing instructions which, when executed by one or more processors, cause:
   receiving, at a first node in a cluster of nodes of a database system, from a second node in the cluster of nodes, a request for first data that the first node has modified;
   wherein each node in the cluster of nodes executes one or more database server instances;
   prior to the first node durably storing redo data that indicates one or more changes that have been made to the first data, sending, from the first node, to the second node in the cluster of nodes, the first data that includes the one or more changes;
   wherein sending the first data comprises sending timestamp data that indicates when the redo data was generated at the first node;
   making, at the second node, based on the first data, one or more second changes to second data that is different than the first data;
   after making the one or more second changes:
      durably storing second redo that indicates the one or more second changes;
      durably storing the timestamp data in association with the second redo.

14. One or more storage media storing instructions which, when executed by one or more processors, cause:
   receiving, at a first node in a cluster of nodes of a database system, from a second node in the cluster of nodes, a request for first data that the first node has modified;
   wherein each node in the cluster of nodes executes one or more database server instances;
   prior to the first node durably storing first redo data that indicates one or more changes that have been made to the first data, sending, from the first node, to the second node in the cluster of nodes, the first data that includes the one or more changes;
   storing, on the second node, last store timestamp data that indicates when particular redo data, made by the first node, was durably stored, wherein the particular redo data is the most recent redo, generated by the first node, that was durably stored;
   storing, on the second node, change timestamp data that indicates when the first redo data was generated by the first node;
   making, at the second node, one or more second changes to second data;
   prior to durably storing second redo data that indicates the one or more second changes, comparing the change timestamp data with the last store timestamp data.

15. The one or more storage media of claim 14, wherein the instructions, when executed by the one or more processors, further cause:
   determining that the last store timestamp data indicates a time that is prior to a time indicated by the change timestamp data;
   in response to determining that the last store timestamp data indicates a time that is prior to a time indicated by the change timestamp data, storing the change timestamp data in association with the second redo.

16. The one or more storage media of claim 14, wherein the instructions, when executed by the one or more processors, further cause:
   determining that the last store timestamp data indicates a time that is after a time indicated by the change timestamp data;
   in response to determining that the last store timestamp data indicates a time that is not prior to a time indicated by the change timestamp data, durably storing the second redo data without storing the change timestamp data in association with the second redo data.

17. One or more storage media storing instructions which, when executed by one or more processors, cause:
   receiving, at a first node in a cluster of nodes of a database system, from a second node in the cluster of nodes, a request for first data that the first node has modified;
   wherein each node in the cluster of nodes executes one or more database server instances;
   prior to the first node durably storing redo data that indicates one or more changes that have been made to the first data, sending, from the first node, to the second node in the cluster of nodes, the first data that includes the one or more changes;
   reading, by a transaction on the second node, second data that is associated with second change timestamp data that indicates when second redo data, that indicates one or more second changes that were made to the second data by a third node in the cluster of nodes, was generated by the third node;
   in response to reading the second data, storing the second change timestamp data in association with the transaction;
   reading, by the transaction, third data that is associated with third change timestamp data that indicates when third redo data, that indicates one or more third changes were made to the third data by the third node, was generated by the third node;
   in response to reading the third data, comparing the second change timestamp data to the third change timestamp data;
   replacing the second change timestamp data with the third change timestamp data if a time indicated by the third change timestamp data is later than a time indicated by the second change timestamp data.

18. One or more storage media storing instructions which, when executed by one or more processors, cause:
   receiving, at a first node in a cluster of nodes of a database system, from a second node in the cluster of nodes, a request for first data that the first node has modified;
   wherein each node in the cluster of nodes executes one or more database server instances;
   prior to the first node durably storing redo data that indicates one or more changes that have been made to the first data, sending, from the first node, to the second node in the cluster of nodes, the first data that includes the one or more changes;
   determining that a first instance on the first node has failed;
   determining a last store timestamp associated with the first instance, wherein the last store timestamp indicates when the latest redo data that was generated by the first instance was durably stored;
   determining that a second instance that is different than the first instance executes a transaction that is associated with a change timestamp that is associated with the first instance;
   determining to abort the transaction if the change timestamp is later than the last store timestamp.

19. One or more storage media storing instructions which, when executed by one or more processors, cause:
   receiving, at a first node in a cluster of nodes of a database system, from a second node in the cluster of nodes, a request for first data that the first node has modified;
   wherein each node in the cluster of nodes executes one or more database server instances;

prior to the first node durably storing redo data that indicates one or more changes that have been made to the first data, sending, from the first node, to the second node in the cluster of nodes, the first data that includes the one or more changes;

determining that the cluster of nodes failed;

determining a last store timestamp that indicates when the latest redo data that was generated by a particular instance in the cluster of nodes was durably stored by the particular instance in the cluster of nodes;

identifying a change timestamp associated with a redo record that is associated with second data, wherein the change timestamp indicates when particular redo data was generated by the particular instance, wherein the second data depends on the particular redo data;

determining whether to apply the redo record to the second data by comparing the last store timestamp with the change timestamp.

20. One or more storage media storing instructions which, when executed by one or more processors, cause:

receiving, at a first node in a cluster of nodes of a database system, from a second node in the cluster of nodes, a request for first data that the first node has modified;

wherein each node in the cluster of nodes executes one or more database server instances;

prior to the first node durably storing redo data that indicates one or more changes that have been made to the first data, sending, from the first node, to the second node in the cluster of nodes, the first data that includes the one or more changes;

determining that a database, to which each node in the cluster of nodes has access, has suffered a media failure;

applying redo data from each node in the cluster of nodes to a backup of the database;

wherein applying the redo data comprises:

determining whether a first redo record, upon which a second redo record depends, has been durably stored;

in response to determining that the first redo record has not been durably stored, discarding the second redo record without applying the second redo record to the backup.

* * * * *

UNITED STATES PATENT AND TRADEMARK OFFICE
CERTIFICATE OF CORRECTION

PATENT NO. : 9,563,521 B2  
APPLICATION NO. : 14/337077  
DATED : February 7, 2017  
INVENTOR(S) : Panteleenko et al.

Page 1 of 1

It is certified that error appears in the above-identified patent and that said Letters Patent is hereby corrected as shown below:

In the Claims

In Column 19, Line 30, in Claim 14, delete "instances:" and insert -- instances; --, therefor.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*